No. 611,462. Patented Sept. 27, 1898.
G. VAN CAMP.
CAN SOLDERING MACHINE.
(Application filed Mar. 30, 1898.)
(No Model.) 10 Sheets—Sheet 1.
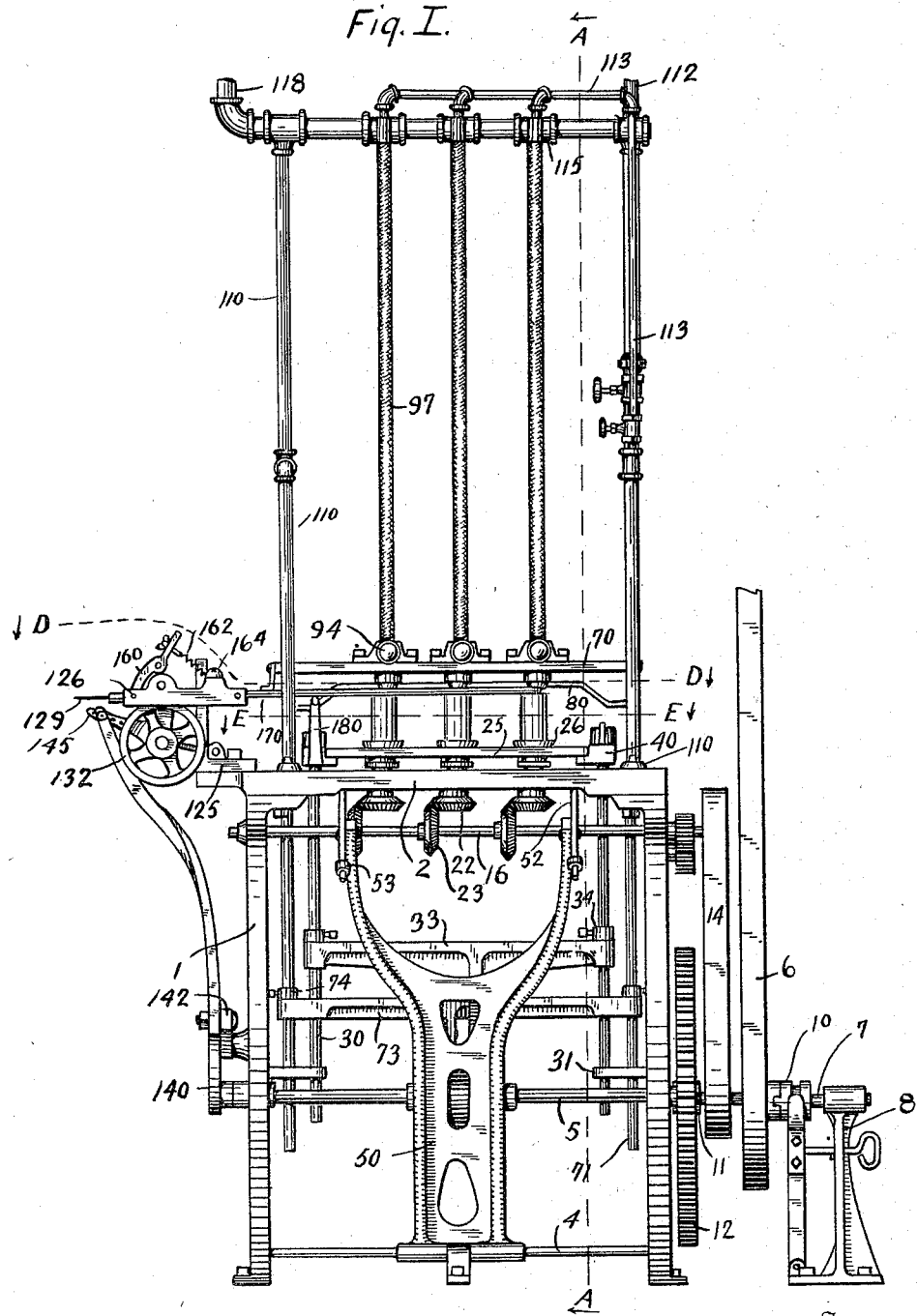
Fig. I.
Witnesses
R. D. Hawkins.
Kate Dunlap.
Inventor
George Van Camp
By V. H. Lockwood
His Attorney.

No. 611,462. Patented Sept. 27, 1898.
G. VAN CAMP.
CAN SOLDERING MACHINE.
(Application filed Mar. 30, 1898.)
(No Model.) 10 Sheets—Sheet 2.
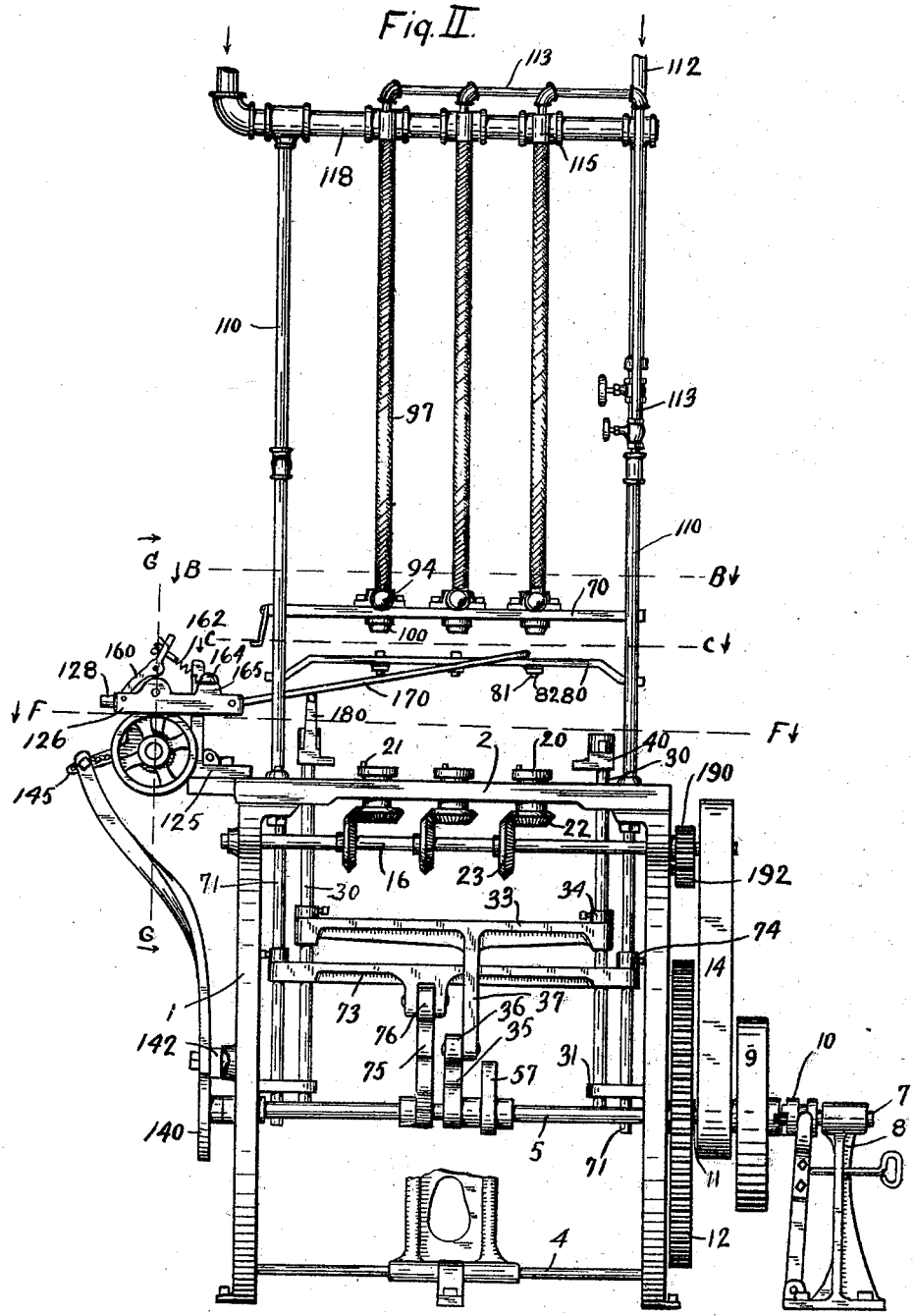
Fig. II.
Witnesses
R. D. Hawkins
Kate Dunlap
Inventor
George Van Camp
By V. H. Lockwood
His Attorney.

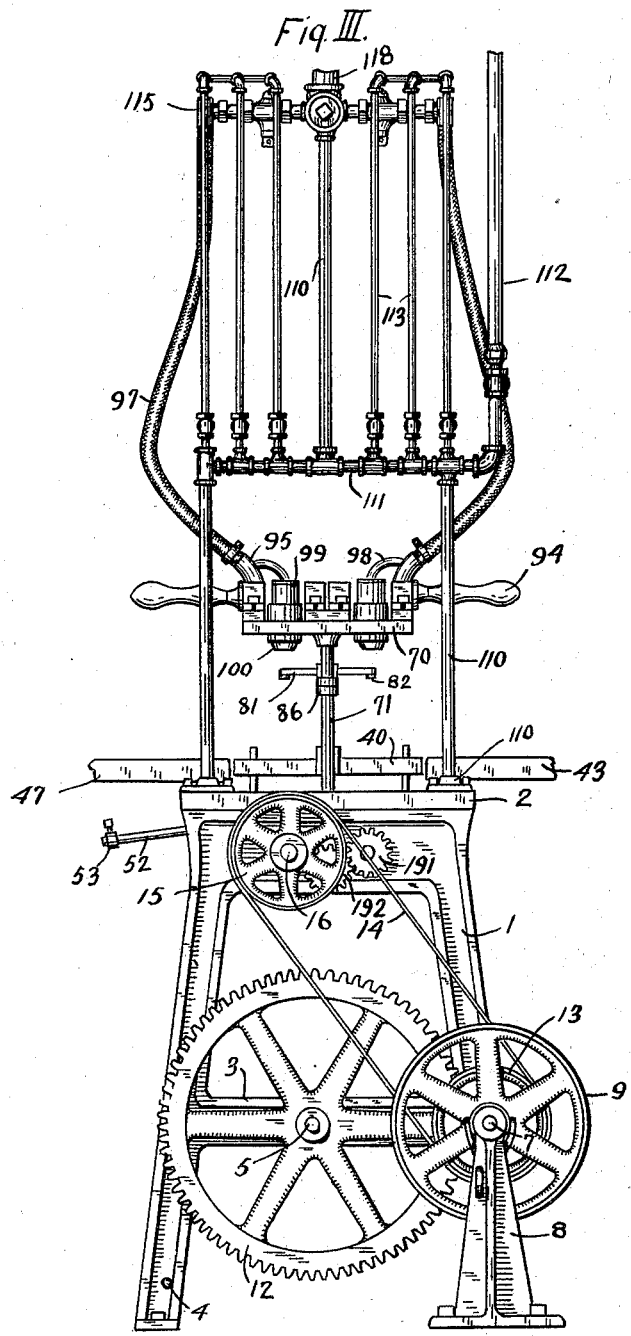

No. 611,462. Patented Sept. 27, 1898.
G. VAN CAMP.
CAN SOLDERING MACHINE.
(Application filed Mar. 30, 1898.)
(No Model.) 10 Sheets—Sheet 4.
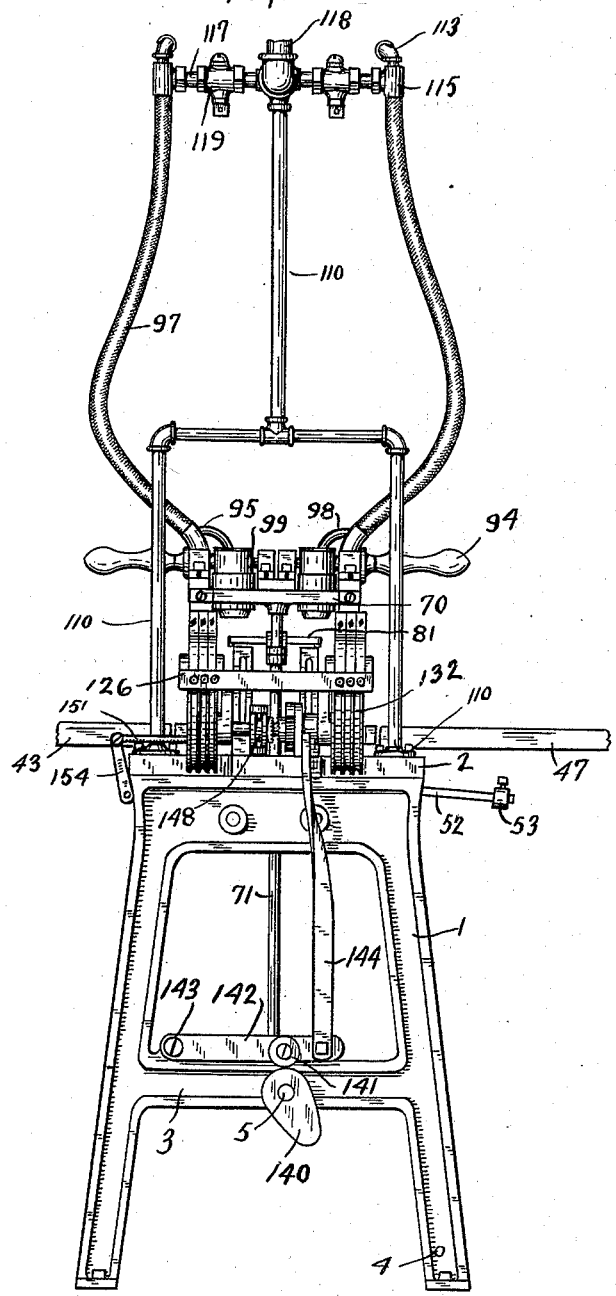

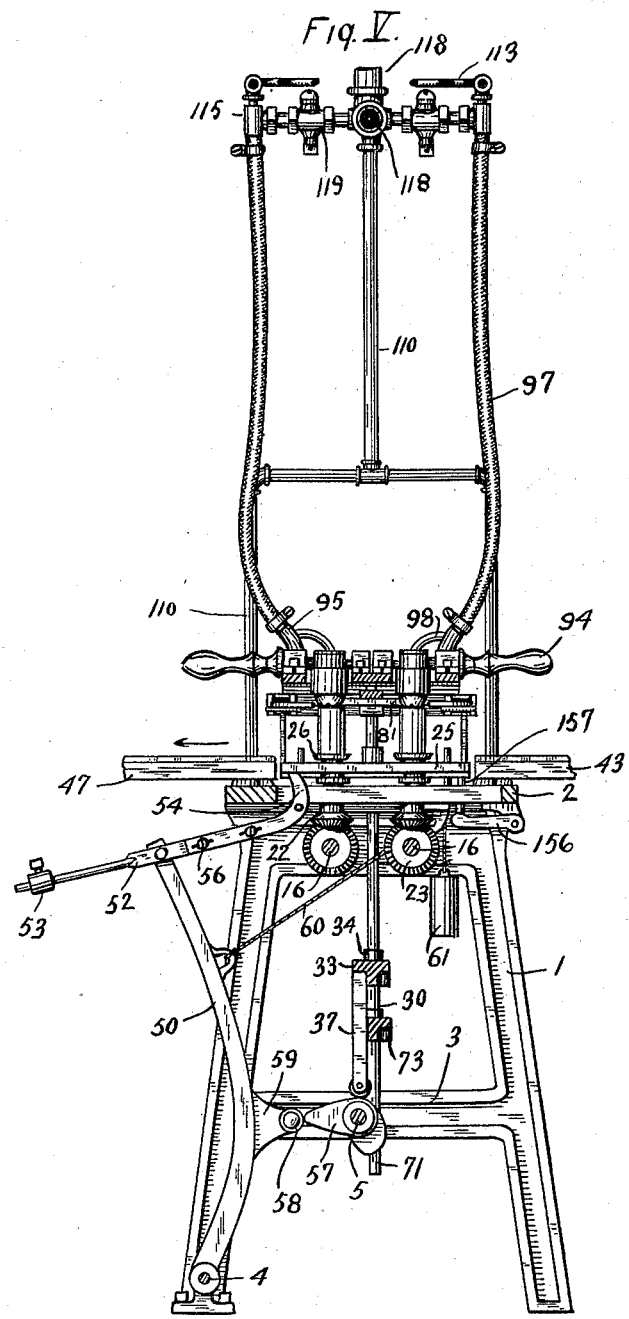

No. 611,462. Patented Sept. 27, 1898.
G. VAN CAMP.
CAN SOLDERING MACHINE.
(Application filed Mar. 30, 1898.)
(No Model.) 10 Sheets—Sheet 6.
Fig. VI.
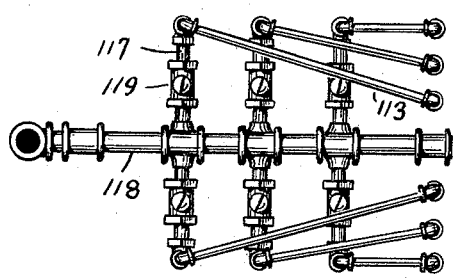
Fig. VII.
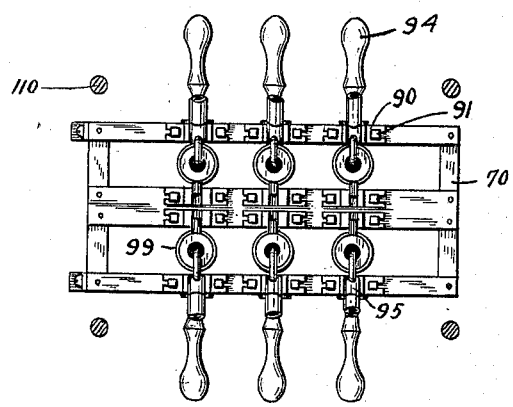
Fig. VIII.
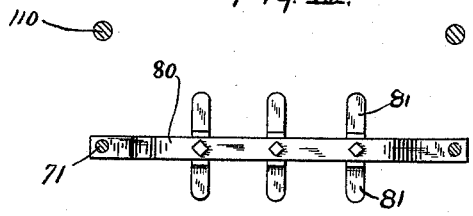
Witnesses
R. D. Hawkins
Kate Dunlap
Inventor
George Van Camp
By T. H. Lockwood
His Attorney.

No. 611,462. Patented Sept. 27, 1898.
G. VAN CAMP.
CAN SOLDERING MACHINE.
(Application filed Mar. 30, 1898.)
(No Model.) 10 Sheets—Sheet 7.
Fig. IX.
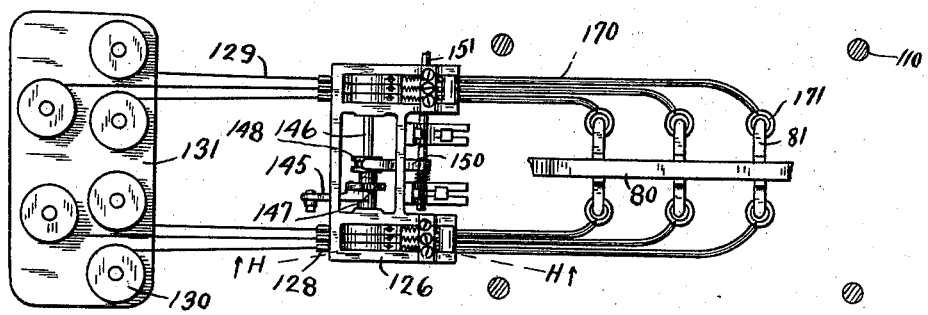
Fig. X.
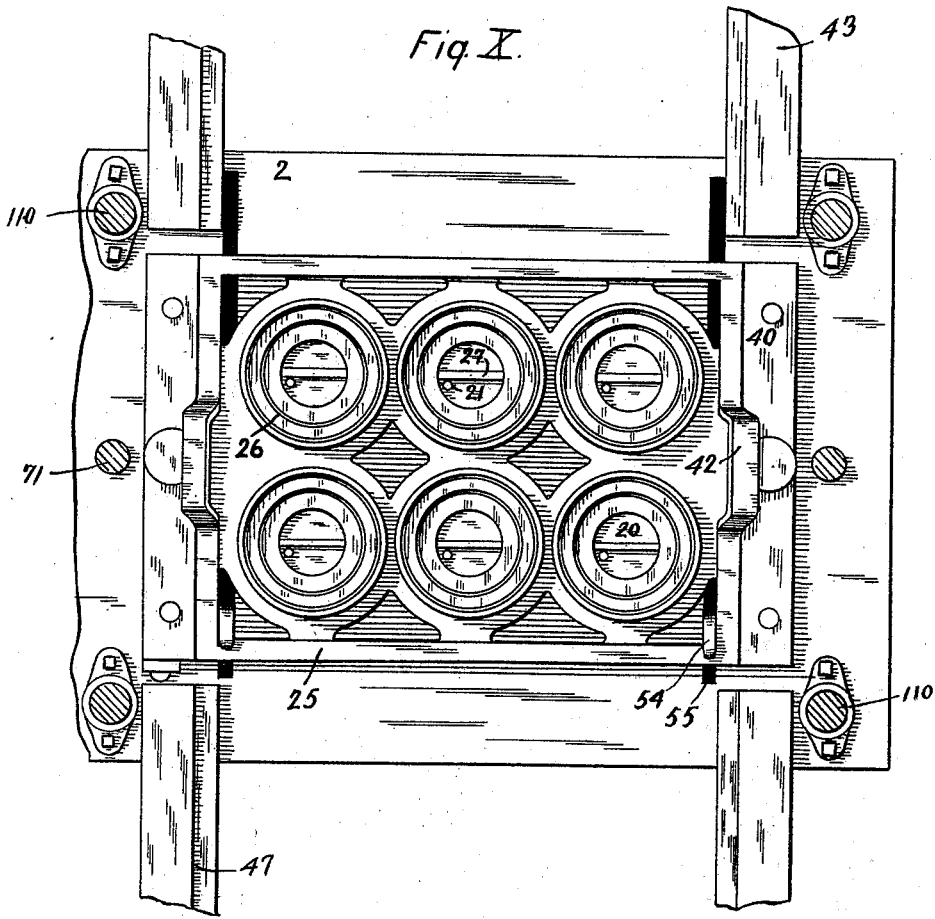
Witnesses
R. D. Hawkins.
Kate Dunlap.
Inventor
George Van Camp
By V. H. Lockwood
His Attorney.
THE NORRIS PETERS CO., PHOTO-LITHO., WASHINGTON, D. C.

No. 611,462. Patented Sept. 27, 1898.
G. VAN CAMP.
CAN SOLDERING MACHINE.
(Application filed Mar. 30, 1898.)
(No Model.) 10 Sheets—Sheet 8.
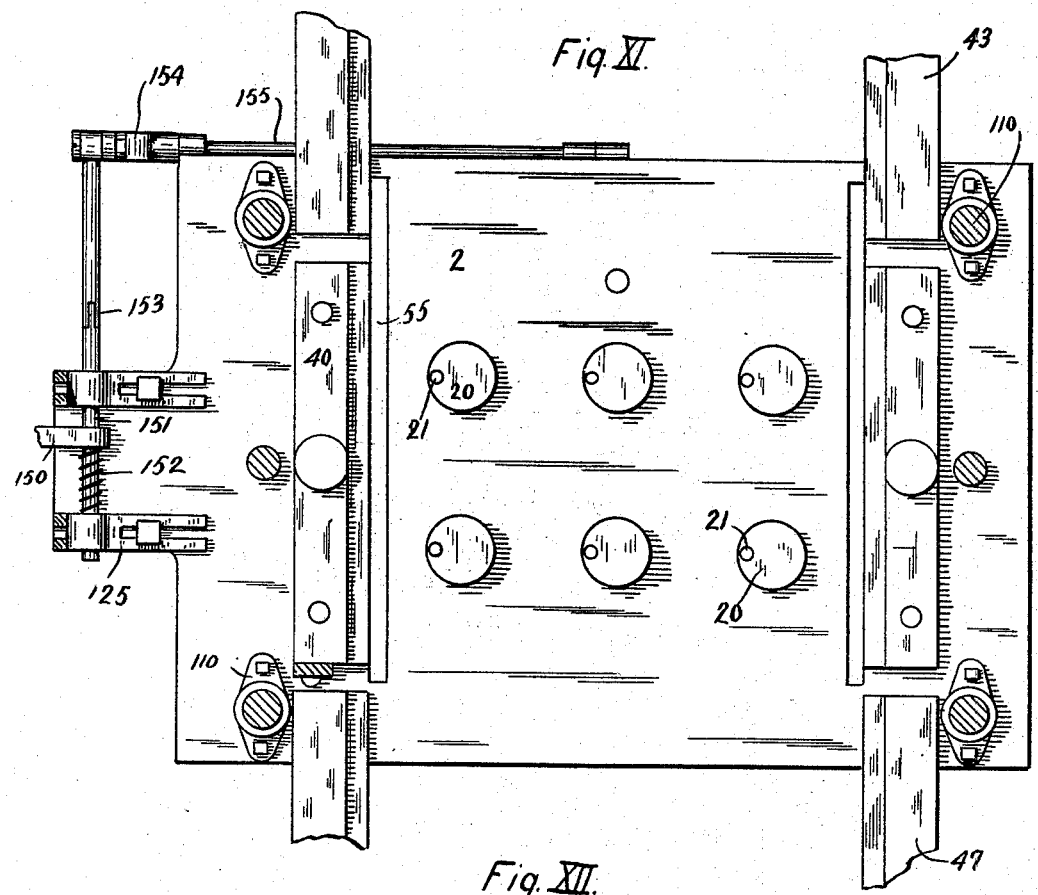
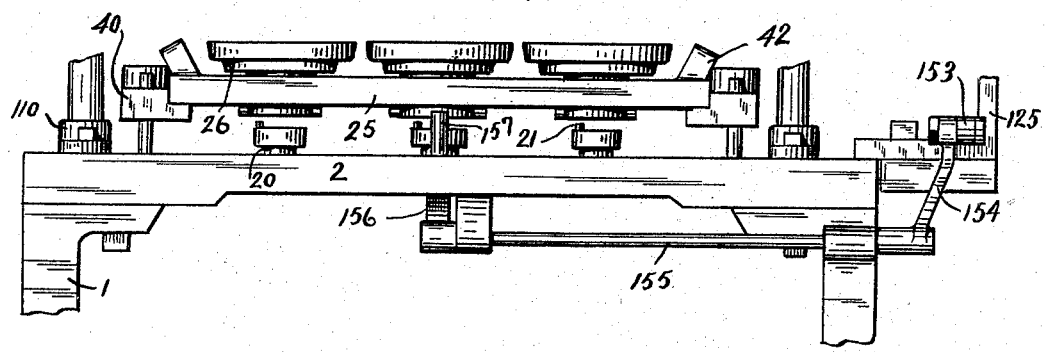
Witnesses
R. D. Hawkins.
Kate Dunlap.
Inventor
George Van Camp
By V. H. Lockwood
His Attorney.

No. 611,462. Patented Sept. 27, 1898.
G. VAN CAMP.
CAN SOLDERING MACHINE.
(Application filed Mar. 30, 1898.)
(No Model.) 10 Sheets—Sheet 9.
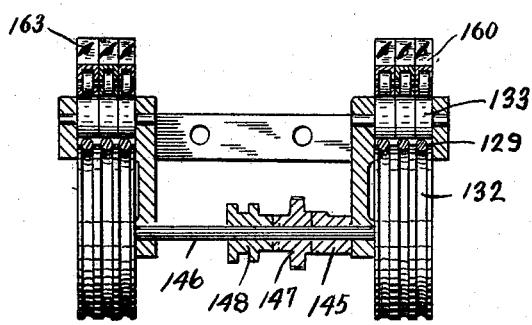
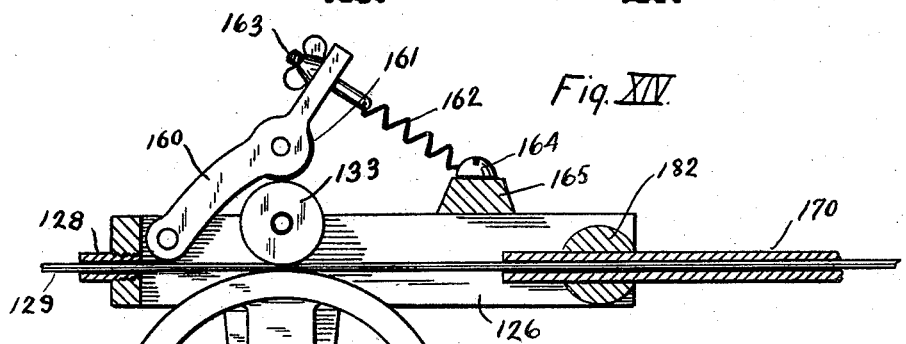
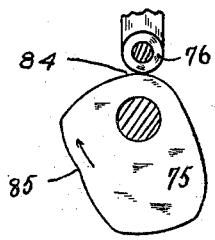
Witnesses
R. D. Hawkins.
Kate Dunlap.
Inventor
George Van Camp
By V. H. Lockwood
His Attorney.

No. 611,462. Patented Sept. 27, 1898.
G. VAN CAMP.
CAN SOLDERING MACHINE.
(Application filed Mar. 30, 1898.)
(No Model.) 10 Sheets—Sheet 10.
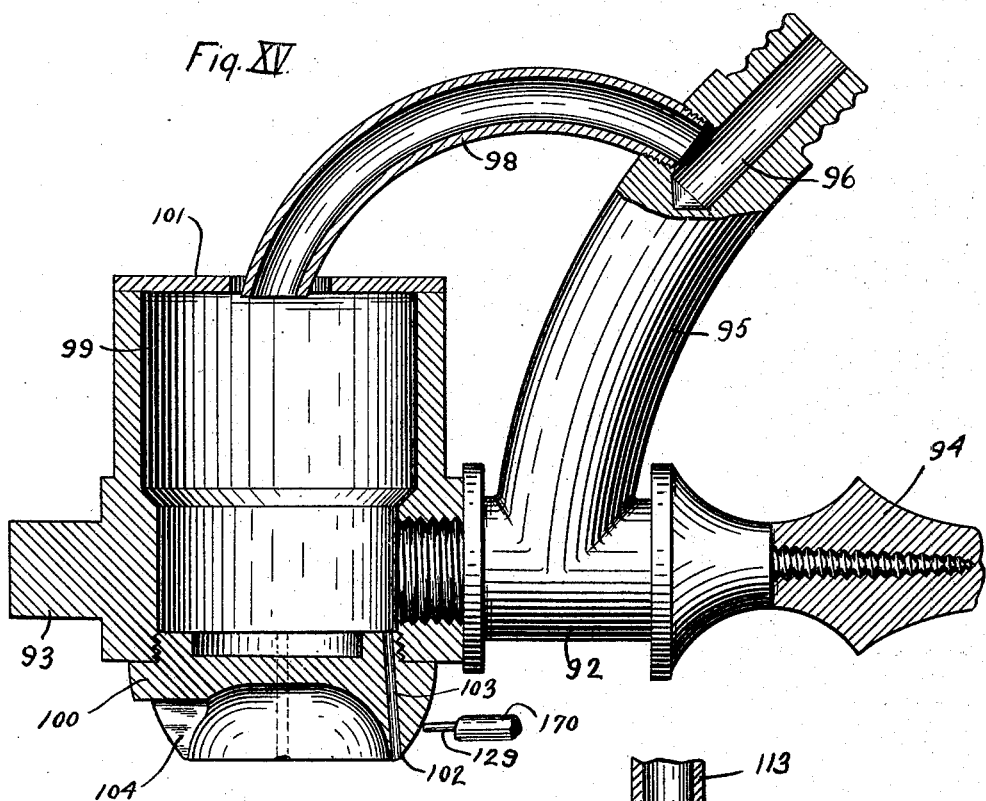
Fig. XV.
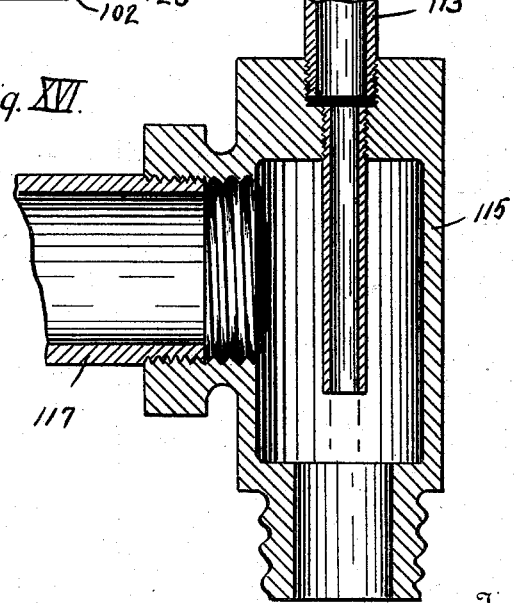
Fig. XVI.
Witnesses
R. D. Hawkins.
Kate Dunlap.
Inventor
George Van Camp
By V. H. Lockwood
His Attorney

UNITED STATES PATENT OFFICE.

GEORGE VAN CAMP, OF INDIANAPOLIS, INDIANA.

CAN-SOLDERING MACHINE.

SPECIFICATION forming part of Letters Patent No. 611,462, dated September 27, 1898.

Application filed March 30, 1898. Serial No. 675,760. (No model.)

*To all whom it may concern:*

Be it known that I, GEORGE VAN CAMP, of Indianapolis, county of Marion, and State of Indiana, have invented a certain new and useful Can-Soldering Machine; and I do hereby declare that the following is a full, clear, and exact description thereof, reference being had to the accompanying drawings, in which like figures refer to like parts.

One object of this invention is a construction that permits the soldering-irons to be separately and readily removable for quickly cleaning them or substituting different sizes without putting out the fire or stopping the machine.

Another object is a construction whereby the soldering-irons are stationary, while the cans are caused to revolve.

Another object is a construction whereby the soldering-irons are separately heated from within and a slight flame therefrom is directed against the groove of the can, whereby the soldering-irons are kept cleaner, less gas is used, and better and faster work can be done.

Another object is a construction of trays that will receive cans of varying sizes.

Another object is a construction wherein the heated soldering-iron and the solder and the cans, when soldered, are separated to prevent the solder being further heated by the soldering-irons and to prevent it from subsequently fusing and attaching itself to the can.

Other features of my invention will appear more fully in the accompanying drawings and the description and claims following.

In the drawings, Figure I is a rear elevation of my can-soldering machine. Fig. II is a rear elevation of the same with parts removed and the machine inoperative. Fig. III is an elevation of the left side of the machine. Fig. IV is an elevation of the right side thereof. Fig. V is a section on line A A of Fig. I. Fig. VI is a plan of the top of the machine, showing the pipe connections. Fig. VII is a section on the line B B of Fig. II. Fig. VIII is a section on the line C C of Fig. II. Fig. IX is a section on the line D D of Fig. I. Fig. X is a section on the line E E of Fig. I with the cans removed. Fig. XI is a section on the line F F of Fig. II, showing the top of the table. Fig. XII is a front elevation of the portion shown in Fig. XI with the tray in place. Fig. XIII is a section on the line G G of Fig. II. Fig. XIV is a section on the line H H of Fig. IX. Fig. XV is a longitudinal section of the soldering-iron. Fig. XVI is a longitudinal section of the gas-mixer. Fig. XVII is a side elevation of the cam that causes the soldering-irons and the cap-holder to be elevated.

In detail a suitable frame 1 is provided with a suitable top 2. The frame is braced and strengthened by suitable cross-bars 3, to be seen in Fig. V. The frame is braced in the other direction by the brace 4 and the shaft 5. (Shown in Fig. II.) This frame is suitably secured to the floor to render it stationary.

The power is supplied to the machine through the belt 6 to the shaft 7, mounted at one end in the framework heretofore described and at the other end in a suitable bearing on the post or frame-piece 8. The belt 6 runs over the pulley 9. (Shown in Fig. III.) A suitable clutch 10 is provided for throwing the mechanism in and out of gear. Any suitable means may be used for this purpose.

On the shaft 7 a small gear 11 is mounted that meshes with the larger wheel 12, which is secured on the shaft 5, all to be seen in Figs. I and II. The shaft 5 thus driven in turn drives the mechanism for feeding the tray, the mechanism for elevating the solder-feed pipes, the tray, the cap-holders, and the soldering-irons, and the mechanism for operating the solder-feeding device. On the said shaft 7 a pulley 13 is mounted, carrying a belt 14 to the pulley 15, mounted on the shaft 16, all to be seen in Figs. II and III. This is utilized to drive the mechanism that revolves the cans while they are being soldered. The outer shaft 16, to be seen in Fig. V, is driven by the gears 190, 191, and 192. (Shown in Figs. I and III.)

The top of the machine is shown clearly in Fig. XI and is provided with a series of holes through which spindles 20 extend, which are provided with upwardly-extending pins 21 to engage the individual can-supports for rotating the cans. The spindles 20 are rotated by the mechanism to be seen in Figs. II and V. On the lower end of the spindle the bevel-gear 22 meshes with the corresponding gear 23, secured on the shaft 16.

The tray 25, to be seen in Fig. X, carries the cans to be soldered. For this purpose the tray is provided with holes to receive can-supporting rings 26. These rings rest loosely on the tray and within the holes, so that they can revolve. The can-supporting rings are provided with a series of depressions of varying diameters to receive cans of varying sizes. The rings shown in Fig. X are adapted for two sizes of cans; but in the machine I use the rings are adapted for four. The depressions for receiving the cans shown are round; but they may be in any other form that the form of the can demands—for example, they may be square. The can-supporting ring is rotated by the engagement of the pin 21 on the spindle 20 with the bar 27, that extends across the opening in the ring, as is shown in Fig. X.

The means for supporting and elevating the tray is as follows: As seen in Fig. II, there are two vertically-extending rods 30, movable through suitable openings or guiding-apertures in the table-top 2 and in the brackets 31. Said rods are vertically reciprocated by the bar 33, through whose ends the rods 30 extend. A collar 34 is secured to the rods 30 by set-screws above the ends of the bar 33, so that the upward movement of the bar will elevate said rods, and they will be moved downward by gravity. Said bar 33 is operated by the cam 35 on the shaft 5, which engages the roller 36, mounted in the extension 37 from the bar 33. On the upper end of said rods I secure a pair of parallel guide-bars 40, to be seen in Figs. II and XII. These guide-bars are provided with oppositely-located grooves which receive the tray 25, as seen in Fig. XI. On each side of said tray there is a handhold 42. In the operation of this part of the machine the cans are placed on the tray and the tray is placed upon the stationary guide-strips 43 and is moved inward into place by mechanism hereinafter described until it is in the position shown in Figs. II and XII. After it is in the position shown in Fig. XII the guide-pieces supporting it are lowered until the pin 21 can safely catch on the bars 27, as heretofore described, whereby the individual cans can be rotated. After the cans are soldered the cam 35 elevates the arm 33, and thereby lifts the tray into the position shown in Fig. XI, whereupon it is pushed out of the machine over the stationary guide-pieces 47 by another tray that is being fed into the machine.

The mechanism for feeding the tray into and out of the machine is as follows: As seen in Figs. I and V, there is a broad lever 50, pivotally mounted at its lower end on the rod 4. At the upper end of said lever 50 there are two pivotally-mounted arms 52, and each has on its outer end a balancing-weight 53, and its inner end is turned up to form a hook 54, that extends through the slot 55 in the table-top, to be seen in Fig. XI, and engages the corner of the tray, as can be seen in Fig. X. Said arm 52 is formed in two pieces, as shown in Fig. V, to render its length adjustable by the set-screws 56. The lever 50 is actuated by the cam 57, mounted on shaft 5, that engages the roller 58, mounted in the brackets 59, and said roller is held against the arm by the rope 60, which runs over a suitable pulley attached to the bottom of the table-top and carries the weight 61. From this description it is seen that the upper end of the lever 50 vibrates forward and backward by the operation of the cam 57, and the weight 53 will hold the inner end of the arm 52 in engagement with the tray, so that it will pull the tray into the machine. The hooked end 54 should be so curved at its point of engagement with the tray that when the hook is moved forward it will disengage itself from the tray. The slot 55 should be long enough to give the engaging hook 54 a sufficient stroke to permit it to catch the tray which is behind the one that is in the machine, and when this tray is moved into the machine it is obvious that the tray already in will be moved rearward and out.

Turning now to the soldering-iron mechanism, a frame 70 is provided, as is seen in Fig. VII, whose ends are centrally mounted upon the vertically-reciprocating rods 71. Said rods extend through suitable guiding-apertures in the table-top, as seen in Fig. IX, and in the bracket 31. Said rods 71 are elevated by the bar 73, through which said rods extend. Above the ends of said bar 73 collars 74 are clamped to the rod 71. The cam 75 is secured to the shaft 5, that engages the roller 76, mounted to the under side of the arm 73.

A suitable cap-holder is provided, as seen in Fig. VIII. It comprises a bar 80, through whose ends the rod 71 loosely moves. Secured crosswise to said bar 80 are fingers 81, one for each can. After the cans are in place to be soldered the cap-holder 80 moves down by gravity, as will be shown, so that the fingers 81 rest upon the center of each cap. On the under side of each finger 81 there is a projection 82, like a screw-head, that contacts with the cap. The cap-holder remains in position until after the soldering is done. Then the soldering-irons are elevated by the engagement of the portion of the cam 75 that extends from the point 84 to the point 85, as seen in Fig. 17, with the roll 76. This elevates the soldering-irons, but not the bar 80, as the collars 86 are secured to the rod 71 sufficiently far below the bar 80 to prevent it being lifted during this part of the operation of the cam 75; but as the cam further operates it elevates the rods 71 so high that the collars 86 elevate the bar 80, thus removing the cap-holding device, so that the cans can be removed from the machine.

Turning now to the soldering-irons, attention is called to Figs. VII and XV. As seen in Fig. VII, seats are provided for the soldering-irons on the bars of the frame 70 by the plates 90, whose ends are slotted to slip under the bolt-heads 91, whereby they can be readily adjusted. These plates have suitable seats to receive the portions 92 and 93 on the soldering-irons. The soldering-irons rest in place by gravity and are manipulated by the handles 94 whenever it is desired to take the irons out of the machine. The soldering-iron has an extension 95 bored out at 96, to which the hose 97 may be secured. From the passage-way 96 a metal pipe 98 leads to the fire-box 99. The fire-box may be screwed into the body of the soldering-iron and may consist of cast-iron, with a steel soldering-point 100 connected therewith, as shown. The gas and air are mixed before they reach the fire-box. The top plate 101 of the fire-box is loose, and the gas is ignited at the end of the tube 98 and burns in the chamber within the fire-box 99, and thus heats the soldering-point 100. The latter has an annular extension or point 102, whose diameter is substantially that of the cap to be put on the can. Within the extension there is a considerable concavity, as shown in Fig. XV. Through the soldering-point 100 series of small passage-ways 103 are provided, through which a slight flame may pass to contact with the groove of the can. On one side of the soldering-point a suitable recess 104 is made, through which the finger 81 of the can-holding device can extend. As many soldering-irons may be used as desired, six being shown in Fig. VII. It is seen that they can be readily removed for cleaning or exchange.

The gas is furnished to the soldering-irons by the following mechanism: From each of the four corners of the table-top rods on ports 110 extend upward, as seen in Fig. II. On the upper end of one pair of said rods a gas-pipe 111 is mounted, as is shown in Fig. III, to which gas is supplied from a supply-pipe 112. A series of small gas-pipes 113 lead from the pipe 111, there being one such small pipe for each soldering-iron, and each of them is provided with a suitable valve. These pipes 113 extend upward, as seen in Fig. III, and then horizontal, as seen in Fig. VI, to the mixing-chambers 115, to be seen in Fig. XVI. Air is supplied to the mixing-chambers 115 through the main air-pipe 118 and the branch air-pipes 117. The mixed gas and air is conveyed from the mixing-chambers 115 through the hose 97, that lead from the lower end of the mixing-chamber, as seen in Figs. XVI and IV. It is seen from these that the amount of gas and also the amount of air can be separately regulated or shut off from any burner.

Turning now to the solder-feeding mechanism, attention is called to Figs. II, IX, and XIV. At one side of the table a bracket 125 is secured, on which a frame 126 is mounted, provided with guide-tubes 170 and 128, through which the strip of solder 129 is fed from the reel 130, to be seen in Fig. IX, mounted on the reel-stand 131. The solder is fed by the grooved wheels 132 and the rollers 133, as seen in Figs. XIII and XIV. The wheel 132 is provided with grooves in which the strips of solder rest, the strips of solder being in the form of round wires, as seen in Fig. XIII. The wheel 132 is actuated by the means shown in Figs. II and IX. As seen in the former figure, a cam 140 is mounted on the end of shaft 5 outside of the frame, and it engages a roller 141 on a lever 142, which is pivoted at 143 to the frame and at the other end to a twisted upwardly-extending arm 144. This bar at its upper end is pivoted to an arm 145, which is mounted, as seen in Fig. XIII, on the shaft 146, that carries the wheels 132. It actuates the ratchet-wheel 147 by a suitable pawl. A clutch 148 is slidably mounted on shaft 146 for throwing the mechanism in and out of gear; but any suitable mechanism for this purpose may be used. This clutch is actuated by the following means: A yoke-arm 150 is secured to the longitudinal movable shaft 151. The clutch is normally held out of engagement by a spiral spring 152. The shaft 151 is jointed at 153 and is actuated by an arm 154 on the end of the shaft 155. These parts are to be seen in Figs. XI and XII. The shaft 155 has on its other end an arm 156, that extends inwardly, as seen in Fig. V. It is actuated by a pin 157, that rests on the end of the arm 156, and extends up loosely through a hole in the table-top for some distance above, as seen in Figs. V and XII. When the tray 25 is lowered from the position shown in Fig. XII to the position shown in Fig. V, said pin 157 is pushed downward, and thereby, through the mechanism just described, the clutch operates and the solder-feeding device is thrown into gear.

A tension device for holding the rollers 133 down on the solder-wires 129 is employed, substantially as shown in Fig. XIV. The little levers 160 are pivoted to the framework at their lower ends. Near their middle there are rollers 161, that ride on the wires over the roller 133. These rollers 161 are drawn downward by the springs 162, that are secured to the upper ends of the levers 160 by set-screws 163 and at their other ends secured by the screws 164 to the block 165. It is obvious that with this mechanism the pressure of the rolls 161 on the wires 129 can be readily adjusted.

The soldering-wires 129 are fed to the soldering-irons through individual metallic tubes or pipes 170, as seen in Fig. IX. In the machine shown there are six—one for each wire. The parts shown in Fig. IX marked 171 are the cans. These tubes terminate near the tops of the cans, so that when the soldering-irons are depressed the soldering-wires issuing from said pipes engage the soldering-points of the irons. The position of said tubes while the cans are being soldered is shown in Fig. I. After the can is soldered the soldering-irons are lifted away from these tubes, as seen in Fig. II, and thus the solder in the tubes is not in any manner subjected to heat, excepting while the soldering is taking place. Usually the solder-wire extends somewhat beyond the ends of the tubes—say one or two inches. In many can-soldering machines heretofore used the solder-wires have been left adjacent to the heated soldering-irons while one tray of cans is being removed and the next fed into the machine. In such cases it is not uncommon for the ends of the solder-wires to become fused, and thus attached to some part of the mechanism, so that the solder would not be fed to the soldering-irons until the fused portion is removed. This has been a source of serious difficulty. These tubes 170, however, must be elevated somewhat to permit removal of cans, and this is accomplished by the means shown in Fig. II. There an arm 180 is secured to the vertically-movable tray-track or guide-piece 40. Said arm has a horizontal portion at its upper end that engages said tubes, and when the tray is elevated it is obvious that the tubes are elevated simultaneously with the tray. This elevation is possible, however, because said tubes are mounted at one end in a bar 182, which is rotatably mounted in the frame-piece 126, as seen in Figs. XIV, IX, and II.

In Fig. II the machine is shown with the tray out and the soldering-iron cap-holder and solder-wire tubes, as well as the guide-piece for the tray, all elevated. In Fig. I there is shown a tray in place carrying a series of cans with all the parts just mentioned depressed into working position.

From the description heretofore it is seen that the soldering-points of the soldering-irons will register or come down upon the cap on the cans. The cap-holding finger will previously be lowered upon the caps to hold them down in place. Since these fingers engage the cap of the cans at a point substantially at the center, they do not interfere with the rotation of the cap and can. Then the cap and can are rotated and the solder is fed through the tubes to the soldering-points, where the heat fuses it and it is deposited on the edge of the cap as it is rotated. When this is done, the parts are all elevated again and the tray in the machine is pushed rearward by the mechanism heretofore described and another tray is drawn into the machine. From this description, also, it is seen that the soldering-irons can be instantly removed for cleaning. This is very important where a high class of work is done, because the soldering-points so frequently need cleaning; also, the soldering-irons can be quickly replaced by others having different-sized soldering-points. These things can be done without stopping the machine, and while the soldering-irons are being cleaned they will still keep heated, as the gas is still burning within their fire-boxes, so that the irons can do work immediately upon replacement.

What I claim as my invention, and desire to secure by Letters Patent, is—

1. A can-soldering machine including non-rotary soldering-irons removably mounted in the machine, gas-tubes leading to the irons for heating them and means for rotating the cans while being soldered.

2. A can-soldering machine including a soldering-iron frame, independent stationary soldering-irons resting loosely thereon, and means for rotating the cans while being soldered.

3. A can-soldering machine including a soldering-iron frame, soldering-irons thereon, a cap-holding device, and means for elevating the soldering-frame first and then the cap-holding device.

4. A can-soldering machine including a soldering-iron frame mounted on vertically-movable rods, soldering-irons on said frame, a cap-holding device so connected with such rods that it will be elevated in the highest movement of the rods, and a cam substantially as shown for elevating the rods.

5. A can-soldering machine including soldering-irons mounted loosely therein provided with a fire-box, a soldering-point at the lower end thereof, means for introducing gas into such fire-box and handles for readily removing or replacing said soldering-irons independently.

6. A can-soldering machine including soldering-irons with a fire-box, an annular soldering-point at the lower end thereof, small conduits from the fire-box to the soldering-point, and means for introducing gas into the fire-box.

7. A can-soldering machine including soldering-irons comprising a body portion, a stem extending upward therefrom whose upper end is tubular and adapted to have a gas-supply tube connected therewith, a fire-box and an inflexible tube extending from the tubular stem to the fire-box.

8. A can-soldering machine including a frame for soldering-irons having a pair of parallel bars, a pair of seats oppositely located on said bars, soldering-irons whose points extend between said bars and provided with bearing portions to rest in said seats, and handles on said irons.

9. A can-soldering machine including a finger for holding the cap on the can a soldering-iron provided with a concavity surrounded by an annular soldering-point with a recess on one side to receive the cap-holding finger, and means for vertically moving the soldering-irons into and out of engagement with the cans.

10. A can-soldering machine including a bar provided with a series of cap-holding fingers, one for each can to be soldered, a series of soldering-irons provided with a concavity surrounded by an annular soldering-point with a recess on one side of it to receive the cap-holding fingers, and vertically-moving guide-rods on which both are so mounted that the soldering-irons will be above and movable independent of the cap-holders.

11. A can-soldering machine including a tray, a track therefor through the machine whose outer sections are stationary and the inner section is vertically movable, and means for elevating such inner section to make it aline with the stationary section when desired.

12. A can-soldering machine including rotatable spindles vertically stationary, a tray provided with rotatable can-holders that register with the spindles, means for lowering the can-holders into and elevating them out of engagement with the spindles, a series of soldering-irons registering with the cans on the tray, and means for lowering the soldering-irons into and elevating them out of engagement with the cans.

13. A can-soldering machine including rotatable spindles vertically stationary, a tray provided with rotatable can-holders, means for lowering the can-holders into and elevating them out of engagement with the spindles, a series of fingers for holding caps on the cans, means for lowering them into and out of engagement with the caps, a series of soldering-irons, and means for lowering them into engagement with the cans after the cap-holders have been lowered in place and elevating them from the cans before the cap-holders are elevated.

14. A can-soldering machine including guides or tubes for guiding the solder to the soldering-irons pivoted near the ends that receive the solder, and means for elevating the other ends of said guides or tubes.

15. A can-soldering machine including a frame for carrying the solder-feeding mechanism, a bar rotatably mounted therein, guides or tubes for guiding the solder to the soldering-irons mounted in said bar, and means for elevating the free ends of said guides or tubes.

16. A can-soldering machine including guides or tubes for guiding the solder to the soldering-irons pivoted near the ends that receive the solder, a vertically-movable track or support for the tray that carries the cans to be soldered, and an arm secured to said track or support that engages said guides or tubes so that they will be elevated when the cans are elevated.

17. A can-soldering machine including soldering-irons, guides or tubes for guiding the solder to the irons means for elevating the soldering-irons from the guides or tubes after the cans are soldered and means for subsequently elevating said guides or tubes from the can.

In witness whereof I have hereunto set my hand this 15th day of March, 1898.

GEORGE VAN CAMP.

Witnesses:
V. H. LOCKWOOD,
KATE DUNLAP.